United States Patent

[11] 3,578,740

[72] Inventors Billy J. Redding;
John T. Steadman; Lorel J. Bragg, St. Albans, W. Va.
[21] Appl. No. 765,758
[22] Filed Oct. 8, 1968
[45] Patented May 18, 1971
[73] Assignee Goodrich Gulf Chemicals, Inc.

[54] DEWATERING PELLETIZER APPARATUS
10 Claims, 6 Drawing Figs.
[52] U.S. Cl. ................................................. 18/12
[51] Int. Cl. .................................................. B29f 3/00
[50] Field of Search .................................... 18/12 (A), 12 (SF), 12 (SI), 12 (SR), 12 (SZ)

[56] References Cited
UNITED STATES PATENTS

| | | | |
|---|---|---|---|
| 2,401,236 | 5/1946 | Fielitz | 18/12 |
| 2,524,751 | 11/1950 | Beager | 18/12 |
| 2,948,922 | 8/1960 | Meslsat et al. | 18/12 |
| 3,023,455 | 3/1962 | Geiger et al. | 18/12 |
| 3,285,163 | 11/1966 | Burner | 18/18 |
| 3,331,101 | 7/1967 | Thomas | 18/12 |
| 3,363,587 | 1/1968 | Harrington et al. | 18/12 |
| 3,364,523 | 1/1968 | Shippers | 18/12 |

*Primary Examiner*—Frank T. Yost
*Attorneys*—J. Hughes Powell and Robert W. Wilson ABSTRACT: Disclosed is a dewatering pelletizer apparatus and method for dewatering and reducing the size of wet polymeric material.

The apparatus is comprised of an elongated barrel housing having an input end and an output end. Escape passages are provided in the barrel wall to permit the escape of liquid from the interior of the housing. A rotatable shaft having screw flights therein is disposed axially within the housing with one end of the shaft disposed within the output end of the housing. A bearing boss is supported within the housing and provides a bearing support for the shaft end. A generally annular screw flight section is secured to the shaft end and is defined by external and internal screw flights. The annular space between the external screw flight and the internal wall of the housing defines a discharge passage for polymeric material. The internal screw flight of the annular screw flight section is disposed closely adjacent the bearing boss thereby preventing polymeric material from entering the bearing chamber. An oil seal is provided adjacent the bearing and extends from the bearing boss into contact with the shaft. A secondary internal screw flight member is secured to the shaft closely adjacent an annular sealing wall extending from the bearing boss. The secondary internal screw flight member and the internal screw flight of the annular screw flight section cooperate to prevent polymeric material from entering the bearing chamber. A generally circular die plate is secured to said housing in blocking relationship to the output end thereof. A plurality of circumferentially spaced apertures are defined in the die plate. A high-speed cutting blade is disposed adjacent the die plate and is adapted to cut the extruded polymeric material into flakes as it emerges from the die plate.

PATENTED MAY 18 1971

INVENTORS
BILLY J. REDDING
JOHN T. STEADMAN
LOREL J. BRAGG

BY Barry Kramer
ATTORNEY.

DEWATERING PELLETIZER APPARATUS

BACKGROUND OF THE INVENTION

This invention relates to a dewatering pelletizer apparatus and method for the dewatering and size reduction of wet polymeric material.

SBR synthetic rubber is a copolymer of butadiene and styrene. Generally there are four steps utilized in the production of SBR rubber: pigment and monomer preparation, polymerization in the reactors, removal and recovery of unreacted butadiene and styrene from the latex, and the coagulation and recovery of the polymer from the stripped latex.

After preparation of the pigments and monomers, polymerization is conducted in an emulsion of the raw materials in water. Upon completion of the polymerization reaction, the unreacted butadiene and styrene are stripped from the emulsion of rubber in water. Subsequently, an acid or an acid salt is added to the emulsion to coagulate the rubber contained therein into a form which, in the industry, is termed crumb.

The more specialized rubbers, which have been developed in recent years, are produced by polymerization in the presence of an organic solvent to form a cement. Upon completion of the polymerization, the organic solvent is stripped from the crumb as the cement is coagulated. Although coagulation can be conducted in several different ways, most of the methods result in the employment of water as the carrier for the rubber crumb.

As a consequence of the methods by which various raw materials are polymerized to elastomeric products, and because of the means of removing the unreacted components and/or solvents from these materials, most such elastomers finally occur as a water slurry. Since the end use of such elastomers requires the elimination of water and volatile solvents in general, this water must be substantially completely removed from the elastomeric material.

A common method of removing water from wet polymeric material is to first pass the material through a dewatering press having interrupted screw flight sections. The screw flights literally squeeze moisture from the material. The product is thereafter discharged from the press through some type of sizing device to reduce particle size and thus facilitate the thermal removal of the remaining moisture.

Upon removal from the dewatering press the polymeric material then drops into a hammermill-type disintegrator or grinder where the chunks of material are shredded.

The shredded product is thereafter passed through a perforated apron-type hot air dryer where substantially complete drying to about 0.50 percent water is accomplished in approximately 2 hours.

A typical dewatering press of the prior art includes an elongated cylindrical barrel housing or enclosure built up from an assembly of barrel bars held together by ring retainers. The barrel bars are slightly spaced to provide escape passages through which liquid can be forced from the housing. Axially disposed within the barrel is a rotatable shaft including several interrupted screw flight sections mounted thereon. In order to prevent the shaft from contacting the internal barrel wall (resulting in excessive wear of the screw flights and the barrel liner) bearing supports are usually provided at either end of the shaft. Because of the difficulty of mounting a bearing within the barrel it is customary to extend the shaft completely through the barrel while supporting the ends of the shaft by means of bearings mounted outside of the barrel. The primary difficulty encountered in mounting a shaft bearing within the barrel is that the polymeric material and vapors under pressure will normally destroy the bearing after a short amount of use. Further, with a bearing mounted within the barrel, great difficulty is normally encountered in providing sufficient lubrication for the bearing.

Consequently, it is customary in the prior art to support the rotating shaft of the dewatering press by means of external bearings supported outside of the barrel. Since the die plate of the dewatering press is normally mounted at the output end of the barrel, it is thus necessary for the rotating shaft to pass through the die plate in order to be supported by the external bearing. The die plate thus must be fabricated with a large hole through the center thereof which serves both to weaken the die and, with the shaft extending through the die, defines an annular ring between the shaft and the die through which large pieces of polymeric material may extrude to cause contamination problems.

A further characteristic of prior art dewatering presses is the cutter structure wherein the cutter blades are secured to the shaft and are driven at the same speed as the shaft. The cutter blades thus rotate at the same relatively slow rate of speed as the screw flight sections producing rough polymeric particles of rather large size necessitating the use of a grinder before oven drying.

This invention provides a dewatering pelletizer in which the end of the rotating shaft is completely supported within the barrel, and the die plate is free of any apertures other than those provided for the purpose of extrusion of the polymeric material.

This invention further provides a cutter structure wherein the cutter blades are driven independently of the shaft at a relatively high rate of speed to produce wafer thin polymeric particles suitable for immediate drying in an oven dryer.

A further characteristic of the prior art dewatering press is that the screw flights, increasing in size as they progress toward the discharge end of the barrel, are usually the cut-flight or interrupted type. Since SBR rubber tends to "pack" under pressure, it must not be confined in a narrow annular space and thus the screw flights must be interrupted. Furthermore, SBR rubber must be masticated by the breaks in the screw flights in order to prevent agglomeration which would entrap moisture in the material and render the application of heat for drying off moisture ineffective.

It has been found that polyisoprene rubber cannot be dewatered satisfactorily by the conventional SBR dewatering press. Differences in the mechanical properties of SBR and polyisoprene rubber provide the basic reason for the failure of the SBR type dewatering press to successfully dewater polyisoprene rubber. Unlike SBR, polyisoprene is as tough and elastic as natural rubber. It is the toughness and elasticity of polyisoprene that renders the drying thereof difficult as will be described hereafter.

In processing SBR rubber it is normal for the product to pass through the outlet of the dewatering press to be chopped into pieces approximately 1 cubic inch in volume by a cutter rotating with the screw shaft at the relatively slow speed of approximately 75 r.p.m. The product then drops into a hammermill-type disintegrator or grinder where the chunks are shredded and thereafter blown to a thermal dryer. The porosity of the SBR material is such that heat will remove the remaining water from the product.

For polyisoprene rubber, however, the SBR dewatering press is inadequate for drying purposes because (a) the fluidic tendencies of polyisoprene material cause it to stretch and wrap around the slow speed cutter and eventually fall off in large chunks of several cubic inches volume, (b) polyisoprene will not shred in a disintegrator, and (c) polyisoprene is essentially nonporous and hence cannot be dried thermally unless it is first reduced to extremely small particle size.

Therefore, in order to completely dry the polyisoprene rubber product that has been dewatered, it must be cut to a particle size or thickness small enough that water molecules can escape from the surface of the material and not depend on the porosity of the material for removal thereof. Thus, the conventional system of dewatering and drying SBR rubber is ineffective with respect to polyisoprene rubber.

This invention provides an apparatus and method for the dewatering and size reduction of polyisoprene rubber and wherein the product can be blown directly from the dewatering pelletizer to a thermal dryer thus eliminating the necessity for the hammermill-type disintegrator used in the prior art with respect to the dewatering and drying of SBR rubber.

BRIEF SUMMARY OF THE INVENTION

Briefly summarized, this invention provides a dewatering pelletizer apparatus and method for the dewatering and size reduction of wet polymeric material.

The apparatus of this invention comprises in combination an elongated barrel housing having an axis, an input end and an output end. Means are provided in the wall of the barrel housing to permit the escape of liquid therefrom. A rotatable shaft having at least a portion thereof disposed axially within the housing is supported for rotation therein with an end of the shaft disposed within the output end of the housing. Screw flight sections are carried by the shaft in order to advance and compact the material within the housing. A die plate is secured to the housing at the output end thereof and includes a plurality of circumferentially spaced apertures for the passage of polymeric material therethrough. The die plate also includes a bearing boss for the purpose of supporting the shaft end within the output end of the housing. A generally annular screw flight section is secured to the shaft at the end thereof and is defined by external and internal screw flights. The annular space between the external screw flight and the internal wall of the housing defines a discharge passage for polymeric material at the high-pressure side of the die plate. The internal screw flight of the annular screw flight section is disposed closely adjacent the bearing boss extending from the die plate whereby polymeric material is prevented from entering the bearing chamber partially defined by the bearing boss. A secondary internal screw flight member cooperates with an annular sealing wall extending from the bearing boss in order to further inhibit the flow of polymeric material into the bearing chamber. A seal is provided immediately adjacent the bearing in order to retain lubricating oil in the bearing chamber. A high-speed cutter is disposed adjacent the external surface of the die plate and is adapted to reduce the size of the polymeric material as it passes through the die plate.

The method of this invention for dewatering and reducing the size of wet polymeric material comprises the steps of:
1. 1. Dewatering wet polymeric material;
2. Extruding said material through a die plate;
3. Shearing the extruded material into thin particle form as it emanates from the die plate;
4. Drying the particles;
5. Recovering the dried particles.

BRIEF DESCRIPTION OF THE DRAWINGS

A more complete description of the apparatus and method of this invention will now be made with reference to the attached drawings in which.

DESCRIPTION OF THE PRIOR ART

Figure 1:
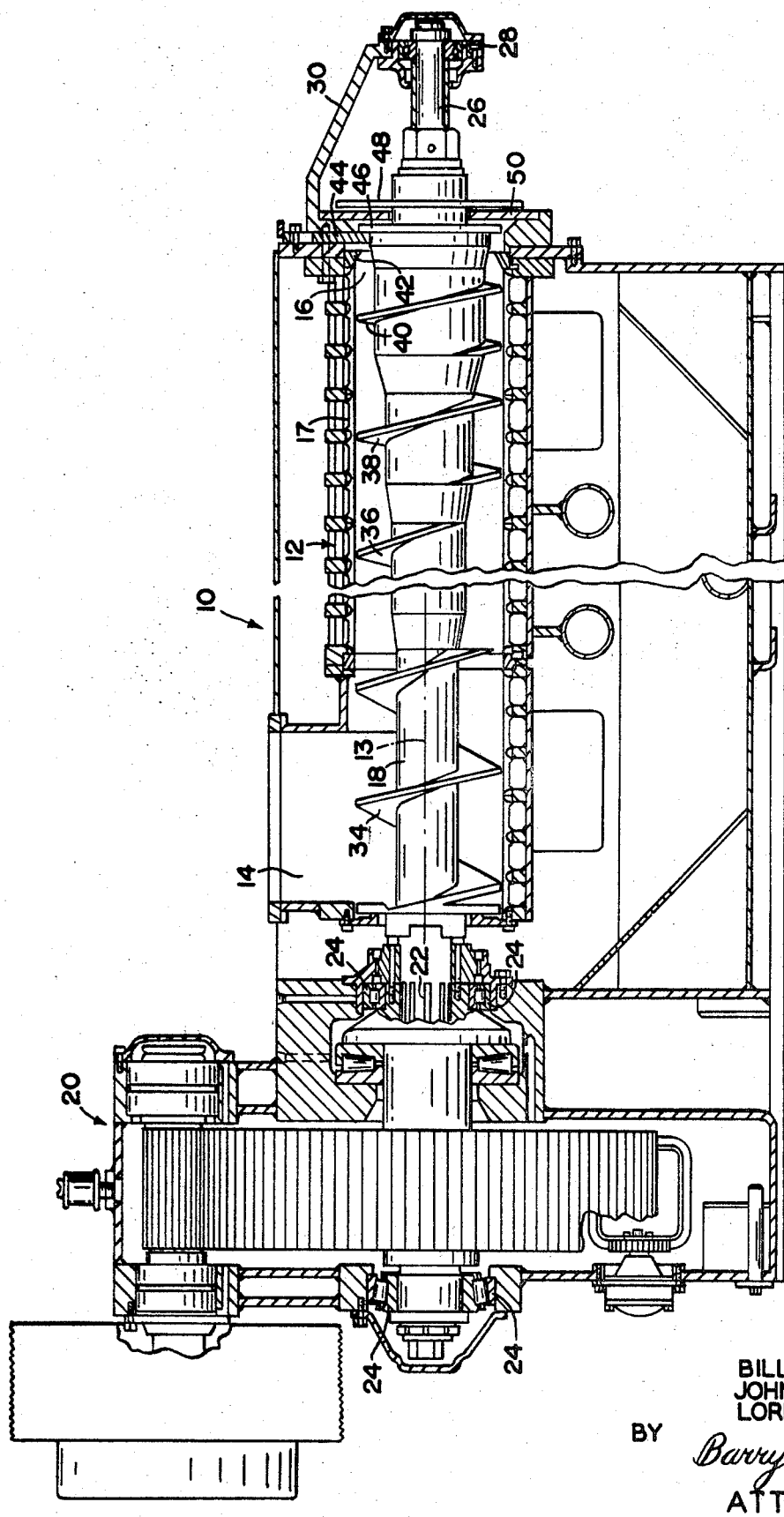
FIG. 1 is a side elevational view, partially cut away and partially in section, of the dewatering press of the prior art.

Before describing the dewatering pelletizer apparatus and method of this invention, attention will first be directed to FIG. 1 wherein there is shown a dewatering press of the prior art. Dewatering press 10 of FIG. 1 is defined by a generally cylindrical barrel housing 12 having an axis 13, an input end 14 and an output end 16. The barrel housing 12 is built up from an assembly of barrel bars 17 held together by semicircular split ring members clamped in tight engagement by clamping bolts (not shown). The barrel bars 17 are slightly spaced to provide longitudinal escape passages through which liquid can be forced. The escape passages, however, are not wide enough to permit the passage of the solid polymeric material.

Disposed axially within the barrel housing 12 is a rotatable shaft 18 driven by a gearcase assembly 20 which in turn receives power from a suitable source (not shown). End 22 of shaft 18 is supported for rotation by means of bearings 24 supported by the gearcase assembly 20. The opposite end 26 of shaft 18 is supported for rotation by means of a bearing 28 supported by the discharge housing 30.

A plurality of screw flights 34, 36, 38 and 40 are provided on the rotatable shaft 18 for the purpose of advancing and compacting polymeric material within the barrel housing 12. It will be noted from FIG. 1 that the dewatering screw flights 36, 38 and 40 increase in root diameter as they progress toward the discharge end 16 of the housing. As an example of the dimensions of the screw flights, a typical 13½ inches SBR dewatering press will have screw flights with diameters increasing from 7 to 10 inches.

At the output end 16 of barrel housing 12 there is provided a discharge ring 42 and several circumferentially spaced choking bars 44. Circumferentially spaced cutter blades 46 and 48 are mounted on the shaft 18 and cooperate with the fixed circumferentially spaced cutter blades 50 mounted on the discharge housing 30. The respective blades 46, 48 and 50 are spaced about the axis 13 of the shaft 18 and may vary in number although in the prior art embodiment of FIG. 1 six circumferentially spaced blade elements are utilized in each set of blades.

The choking bars 44 may be radially adjusted to not only produce a localized obstruction to increase the extraction of liquid from the material in the press, but also to cause such material to issue from the press in a predetermined form. As the material issues from the press it is cut by the rotating sets of cutter blades 46, 48 cooperating with the fixed set of blades 50.

By a selective interposition of the choking bars 44 a predetermined localized source of back pressure may be achieved. For a more complete description of the choking bar structure of the prior art embodiment of FIG. 1 reference is made to the Ginaven U.S. Pat. No. 3,288,056 (Cl. 100–98).

Briefly reviewing the operation of the prior art dewatering press of FIG. 1, wet polymeric material is introduced into the press at the input end 14 where it is advanced into the barrel housing 12 by means of the feed screw flight 34. The feed screw flight 34 forces the material into the dewatering screw section of the barrel housing 12 where the progressively larger root diameter screw flights 36, 38 and 40 squeeze moisture from the product and discharge it through the longitudinal slits defining escape passages in the wall of the barrel housing 12. The compacted material is thereafter passed through the discharge ring 42 and the choking bars 44 after which it is reduced to size by means of the rotating cutter blades 46 and 48.

THE PROBLEM DEFINED

The dewatering press of the prior art as shown in FIG. 1 was designed primarily for the dewatering of regular SBR polymers. However, it has been found that this type of press will not perform satisfactorily on polyisoprene polymers such as cis-1-4-polyisoprene due to the differences in the elasticity and toughness of the respective polymers.

In processing SBR polymers it is normal for the material to pass through the discharge end of the press and to be chopped into pieces approximately 1 cubic inch in volume by the blades 46, 48 (FIG. 1) rotating with the shaft 18 at a relatively slow speed of about 75 r.p.m. The product then drops into a hammermill-type disintegrator or grinder where the chunks are shredded and thereafter conveyed to a thermal dryer. The porosity of conventional SBR material is such that the heat of the thermal dryer will substantially completely remove the remaining moisture from the product.

For polyisoprene type polymeric material, however, the conventional SBR apparatus is not satisfactory due to a number of factors. The elasticity and toughness of polyisoprene polymeric material cause it to stretch and wrap around the relatively slow rotating cutter blades 44, 46 of the prior art press of FIG. 1. Having become entwined in the cutter blades, the polyisoprene material eventually drops off in large chunks of several cubic inches volume. When conveyed to the hammermill-type disintegrator, the polyisoprene material will not shred due to its toughness and thus approximately the same size pieces emerge from the disintegrator as are initially fed into it. Since the polyisoprene polymeric material is essentially nonporous, it cannot be dried thermally unless it is first reduced to extremely small particle size.

Thus, in order to effectively dry polyisoprene polymeric material, it must first be shredded to a particle size or thickness small enough for the water molecules to escape from the surface of the material since the product is nonporous. Therefore, since the dewatering press of the prior art is not capable of reducing polyisoprene material to a relatively small particle size, drying of polyisoprene material through the use of the prior art press with thermal dryers has been ineffective.

THE CONTRIBUTION

Figure 2:
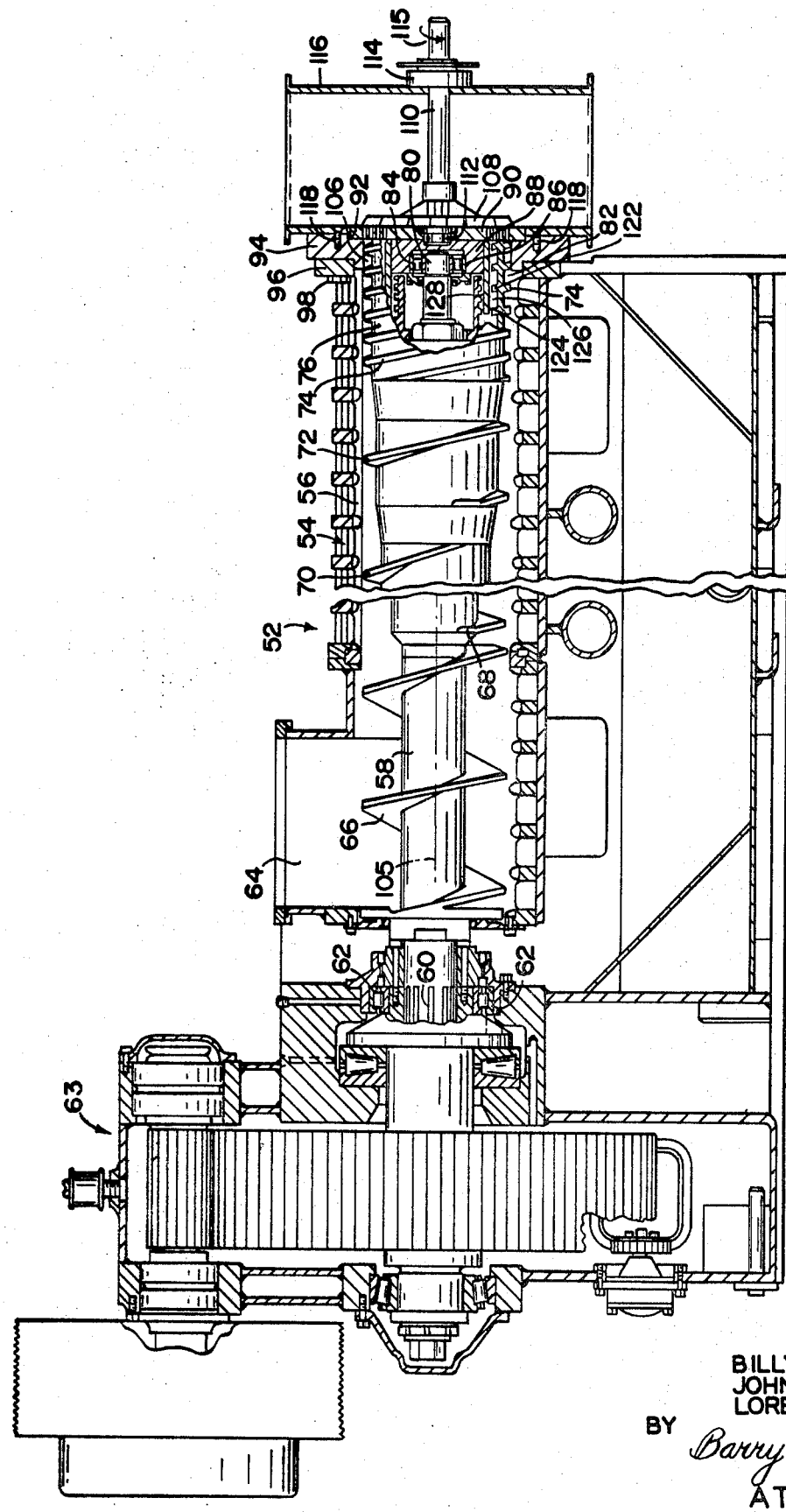
FIG. 2 is a side elevational view, partially cut away and partially in section, of the dewatering pelletizer of this invention.

Attention is now directed to FIG. 2 wherein a dewatering pelletizer embodying the principles of this invention is shown. The dewatering pelletizer 52 of FIG. 2 includes a barrel housing 54 defined by a plurality of dewatering screen bars 56. As in the prior art dewatering press of FIG. 1, the dewatering screen bars 56 of FIG. 2 are slightly spaced to provide escape passages through which liquid can be forced. These passages, however, are not wide enough to permit escape of solid material. A rotatable shaft 58 is disposed axially within housing 54. End 60 of shaft 58 is disposed axially within housing 54. End 60 of shaft 58 extends through the barrel housing 54 and is supported for rotation by means of a bearing 62 which may be mounted within the frame of a suitable gearbox 63. It is to be understood that the shaft end 60 of FIG. 2 is adapted to be driven by means of any suitable power source through gearbox 63 much in the same manner as the dewatering press of FIG. 1. In the interest of brevity, the complete details of the gearbox 63 will not be described as they do not comprise any part of the invention.

Barrel housing 54 is provided with an input end 64 in the form of a feed box into which wet polymeric material is disposed.

Shaft 58 is provided with several screw flight sections including in this embodiment a feed screw flight 66 and four dewatering screw flights 68, 70, 72 and 74.

It will be noted that whereas the dewatering screw flights 68, 70 and 72 are of the cut-flight type with the root diameters thereof slightly increasing, the last dewatering screw flight 74 is continuous and in the preferred embodiment of FIG. 2 increases in diameter at a constant rate over a relatively long screw length. Within the scope of this invention should also be considered a constant diameter screw flight 74.

As an example of relative sizes, the diameters of the screw flights 66, 68, 70 and 72 in the preferred embodiment are respectively 11, 11, 12 and 12½ inches. Screw flight 74 of the preferred embodiment is continuous and increases in root diameter at a constant rate over a 24 inch length without a break in the flight.

As will be more fully described hereafter the dewatering screw flight 74 is defined on the external surface of a generally annular screw flight section 76 adapted to be secured to the shaft 58.

The inner end 80 of shaft 58 is adapted to be rotatably supported within the output end 82 of the barrel housing by means of a shaft bearing 84 seated on a bearing seat 86 defined by bearing boss 88 extending from die plate 90.

Die plate 90 is adapted to be received within counterbore 92 of die-centering ring 94 and is secured thereto by means of suitable fasteners (not shown). Die-centering ring 94 is, in turn, adapted to be secured to the barrel housing 54 at flange 96 by means of bolts 98.

It is thus to be understood that the die-centering ring 94, die plate 90, and bearing boss 88 are fixed with respect to the barrel housing 54 and serve to support the inner end 80 of housing 12 having an end 26 supported outside of the barrel housing 58 within the barrel housing 54.

At this point a comparison may be made between the dewatering pelletizer of FIG. 2 and the prior art dewatering press of FIG. 1. Whereas, the shaft 18 of FIG. 1 extends completely through the barrel housing by means of bearing 28 and discharge housing 30, the shaft 58 of FIG. 2 terminates inside the barrel housing at the high-pressure side of the die plate 90 and, in the preferred embodiment of FIG. 2, is rotatably supported by bearing boss 88 of die plate 90. The advantages of the structure of FIG. 2 will become apparent as the description proceeds.

Figure 3:
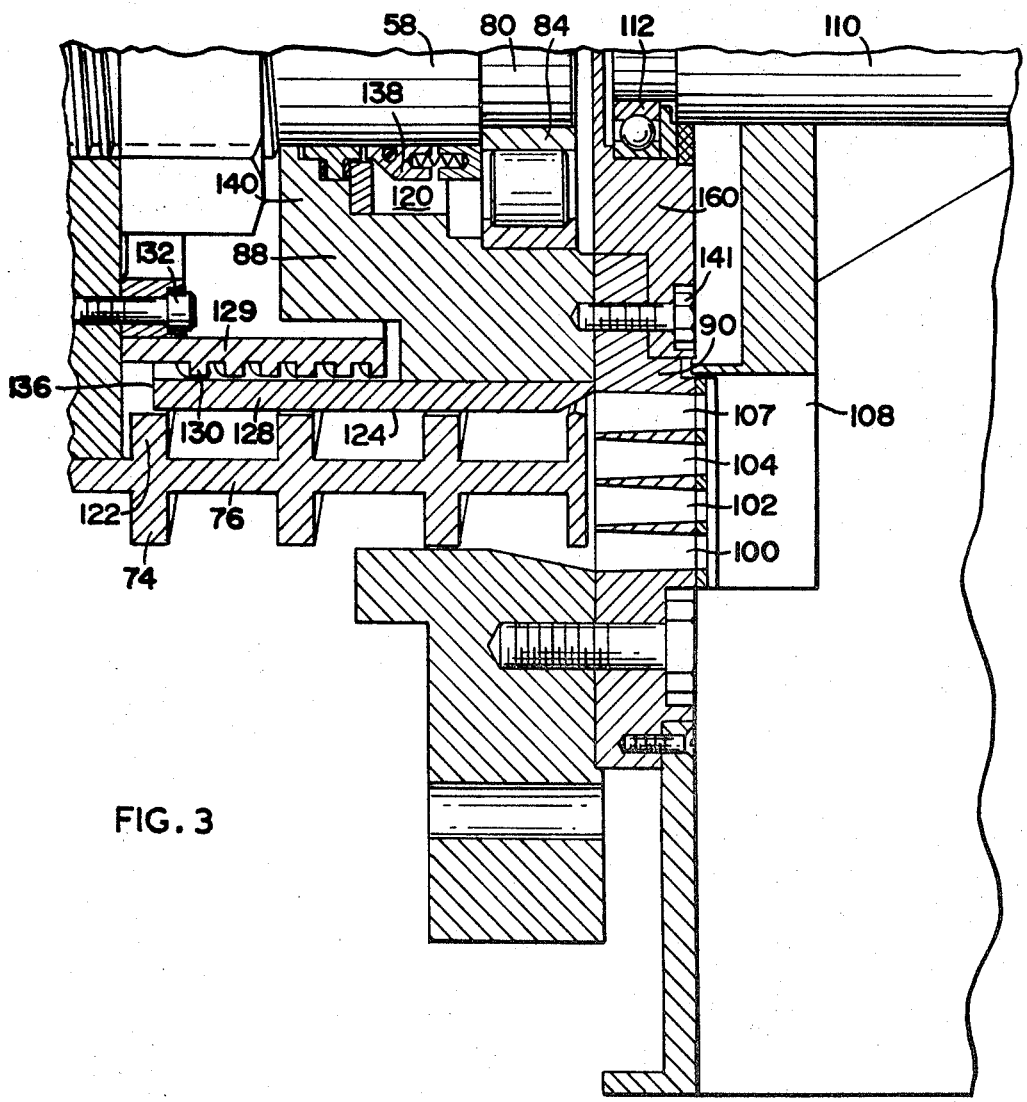
FIG. 3 is an enlarged sectional view of the die plate area of the apparatus of this invention and showing in detail the annular screw flight section, the secondary internal screw flight member, and the oil seal of the bearing chamber.

The die plate 90 of FIG. 2 is provided with a plurality of circumferentially spaced apertures 100, 102, 104 and 107 (FIG. 3, 4). As shown in FIG. 2 the apertures are clustered at various radii from the axis 105 of the die plate and are generally disposed within the path of polymeric material as it is discharged from annular space 106 defined by screw flight 74 and the internal wall of barrel housing 54.

It is to be noted that except for the rows of apertures 100, 102 and 104, the die plate 90 is otherwise impervious to the flow of material therethrough. The necessity for providing a central passage for the rotating shaft (as when the shaft is supported externally of the housing as in FIG. 1) has been eliminated.

As the polymeric material is extruded through the rows of apertures 100, 102 and 104 of FIG. 2, it is cut to size by means of spaced cutter knives 108 carried by shaft 110. In the preferred embodiment of this invention shaft 110 is provided with a total of eight equally spaced cutter knives 108 each having a sharp leading edge. One end of shaft 110 is supported for rotation by means of bearing 112 disposed within a suitable recess in the die plate 90. Shaft 110 is further supported for rotation by means of bearing 114 carried by cutter housing 116. Cutter housing 116 is, in turn, secured to die-centering ring 94 by means of fasteners 118. As shown in FIG. 2, cutter housing 116 defines a portion of an air conveyor system that is utilized to blow the polymeric product to a thermal dryer. Suitable rotation means (not shown) may be employed such as an electric motor to drive shaft 110 at 115 thus independently rotating the cutter knives 108 to cut the polymeric product as it is extruded from the die plate 90.

In comparison the the prior art dewatering press of FIG. 1 it should be noted that shaft 110 of FIG. 2 is driven independently of the shaft 58 to provide a cutter speed independent of the dewatering screw flight speed. Thus, whereas in the prior art dewatering press of FIG. 1 the cutter blades 46, 48 rotate at the same relatively slow speed as the dewatering screw flights 36, 38 and 40 (around 75 r.p.m.), the cutter knives 108 of FIG. 2 are driven at a relatively high rate of speed (approximately 1,750 r.p.m.) thus to cut the extruded material into flakes about 1/64 inch thick and ⅜ inch in diameter or smaller, depending upon the rate of production.

Since the product is cut to relatively small particle size by the high-speed cutter knives 108, it is blown directly from the cutter housing 116 to a thermal dryer by means of an air conveyor system for the substantially complete removal of any remaining moisture without the necessity of passing through a hammermill-type disintegrator or grinder as is characteristic of prior art processes utilizing the dewatering press of FIG. 1. It is to be understood that the housing 116 of FIG. 2 may have suitable conduit attached to it such that forced air may be utilized to blow the extruded and cut material flakes directly to a thermal dryer.

REVIEW OF OPERATION

To briefly review the operation of the dewatering pelletizer of FIG. 2 the wet polymeric material is introduced into the barrel housing 54 at the input end 64. The material is thereafter advanced by feed screw flight 66 into the dewatering section of the housing where moisture is squeezed from the material by means of the dewatering screw flights 68, 70, 72 and 74. The final dewatering screw flight 74 is a relatively long continuous screw of increasing diameter defining, with the internal wall of the housing 54, a narrow substantially annular space 106. The material is thereafter extruded through the several rows of apertures 100, 102 and 104 where it is cut into particle form by means of the high-speed cutter knives 108.

It has been found that the relatively long, continuous, increasing diameter screw flight 74 defining the generally annular space 106 provides dewatering to a much greater degree than that of the conventional structure of FIG. 1. A product having 2—3 percent moisture is common with the dewatering pelletizer of FIG. 2 as compared to a product containing 8-—14 percent moisture when passed through the dewatering press of FIG. 1.

A principal advantage of supporting the inner end of shaft 58 of FIG. 2 within the barrel housing 54 is that the cutter knives may be mounted independently of the screw flights. The cutter knives may thus be turned at a higher rate of speed than the screw flights to produce small product particles.

Further, the termination of the shaft within the barrel housing eliminates the necessity to provide a large hole in the center of the die plate. This hole not only weakens the die plate but it also defines an annular space between the shaft and the die plate through which rather large product particles could extrude producing contamination problems.

BEARING SEALING

Since the shaft 58 of FIG. 2 terminates at the output end of the barrel housing at the high-pressure side of the die plate 90, this invention provides a seal to keep the polymeric product out of the bearing thus to preserve the life of the bearing.

Figure 4:
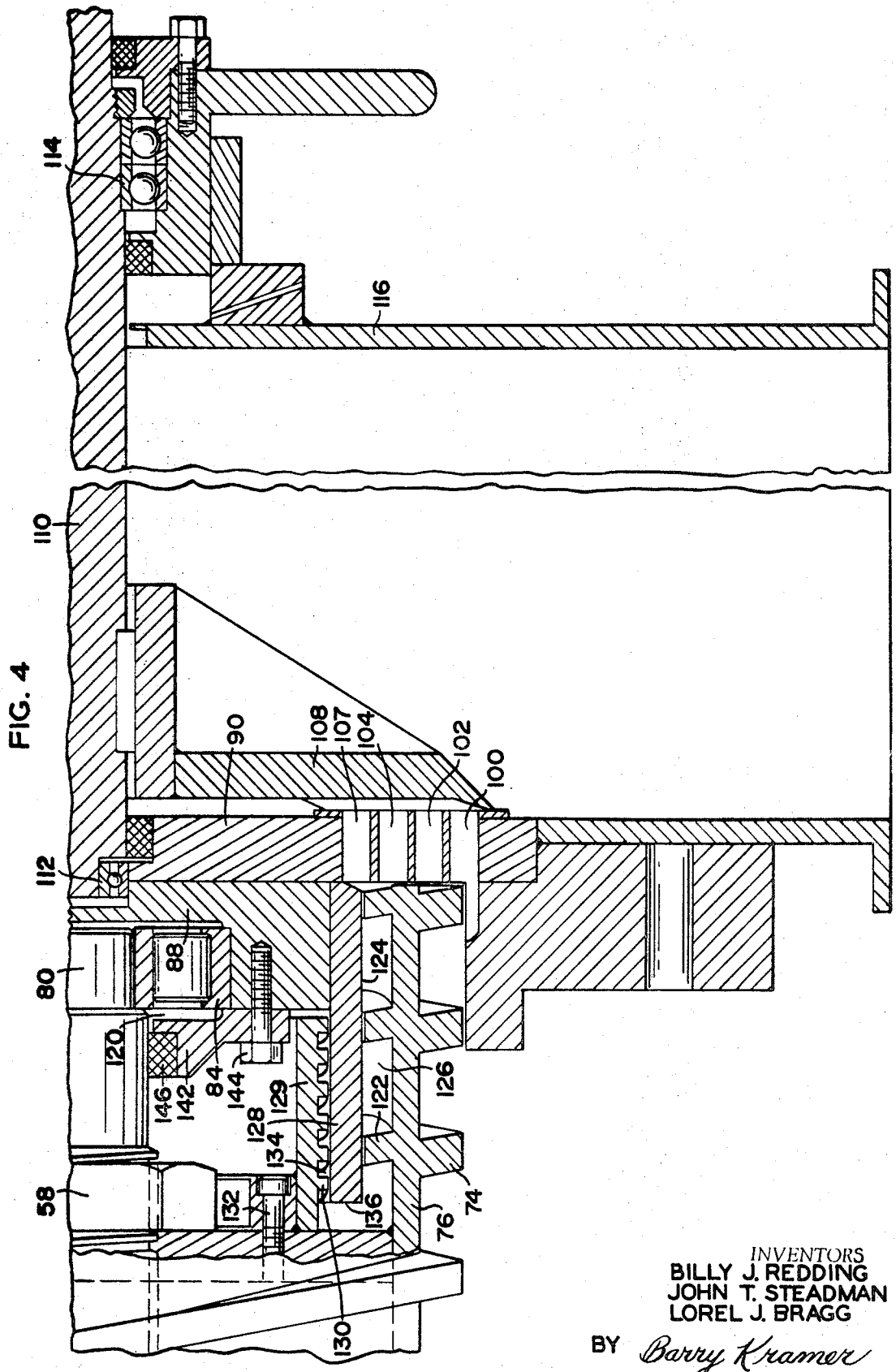
FIG. 4 is an enlarged sectional view similar to FIG. 3 and showing a modification of the oil seal of FIG. 3.

Conventional sealing structures generally cannot withstand the high pressures of the barrel interior and thus cannot provide sustained sealing of the chamber surrounding the bearing. In the dewatering pelletizer of this invention as shown in FIGS. 2 and 4, the generally annular screw flight section 76 is provided with both an external dewatering screw flight 74 and a primary sealing internal screw flight 122. The primary sealing screw 122 is generally similar to the dewatering screw flight 74 and is adapted to be disposed closely adjacent the cylindrical surface 124 of bearing boss 88 and acts to force material toward the die plate 90 from the space 126. A generally annular sealing wall 128 extends from the bearing boss 88. The external surface of sealing wall 128 defines a cylindrical extension of surface 124 and cooperates with the primary internal screw 122 to force all polymeric material that may be compacted into the space 126 toward the die plate 90.

A secondary sealing internal screw flight member 129 having a screw flight surface 130 is disposed closely adjacent the internal surface of sealing wall 128. Secondary sealing internal screw flight member 129 is secured to a radial shoulder of screw flight section 76 by means of fasteners 132. The thread direction of the secondary internal screw flight 130 is opposite to that of the primary internal screw flight 122 such that material within the space 134 will be forced toward the outer extremity 136 of the sealing wall 128 and thereafter will be conveyed to the die plate 90 by means of the primary internal screw flight 122.

It will be noted from FIG. 4 that the various sealing elements including the screw flight section 76, sealing wall 128, and secondary internal screw flight member 129 are coaxial. Rotation of shaft 58 produces rotation of the secondary internal screw flight member 129 and the primary internal screw 122 about the sealing wall 128. Any polymeric product within the screw flight section 76 is thus forced toward the die plate 90 by means of the rotating internal screw flights 122, 130 (having an opposed thread sense).

Depending upon the type of bearing utilized to support the inner end 80 of the shaft 58 carrying the screw flight sections, this invention provides for a seal extending from the bearing boss 88 and contacting shaft 58 such that lubricating oil may be retained in bearing chamber 120 and the purity of the oil maintained. This seal also prevents the entry of steam and other vapors into the bearing chamber which could shorten the life of the bearing.

In FIG. 3, one form of the oil and vapor seal is shown including a mechanical seal 138 providing sealing between the rotatable shaft 58 and extension 140 of bearing boss 88. The integrity of bearing chamber 120 is thus preserved.

An alternate embodiment of the lubricating oil and vapor seal is shown in FIG. 4 wherein a seal holder 142 is attached to bearing boss 88 by means of fastener 144. A seal 146 fabricated from elastomeric or other suitable material is carried by seal holder 142 and contacts the external surface of shaft 58 thus to provide sealing of bearing chamber 120.

Lubricating oil may be supplied to bearing chamber 120 as by means of a suitable internal feed passageway (not shown) defined in the die plate assembly.

Briefly reviewing the oil and vapor sealing structure of the apparatus of this invention, the seals 138, 146 of FIGS. 3 and 4 are designed primarily to contain lubricating oil within the bearing chamber 120 thus to provide a continuous source of lubrication for the bearing 84. Seals 138, 146 further isolate bearing 84 from harmful steam and other vapors squeezed from the polymeric material by the dewatering screw flights.

Screw flights 122, 130 cooperating with sealing wall 128 inhibit the flow of polymeric material into bearing area.

METHOD

This invention is also directed to a method for dewatering and reducing the size of polymeric material and in particular of cis-1-4-polyisoprene.

Figure 5:
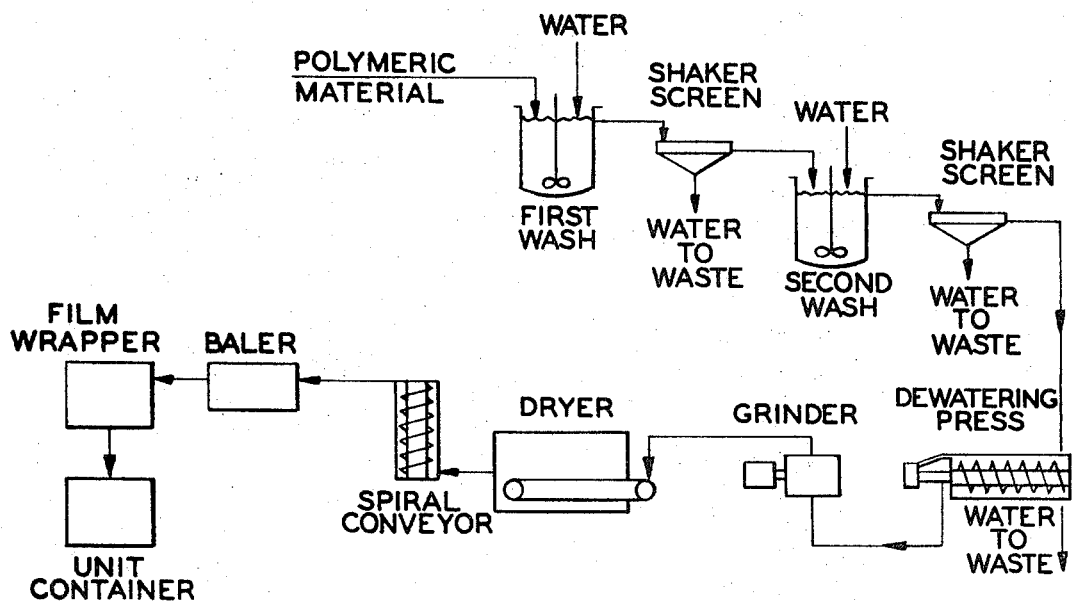
FIG. 5 is a flow chart of the process steps employed by the prior art in substantially completely drying rubber.

The prior art method for drying SBR type polymeric material is shown in FIG. 5. After polymerization the wet polymeric material is passed through a first and second water wash. After the second water wash the rubber-water slurry is passed across a shaker screen where the moisture content of the rubber is reduced to about 50 percent. From the shaker screen the product drops into the input end of a dewatering press where a feed screw forces the material into the dewatering screw section of the press. In the dewatering section progressively increasing root diameter screw flights squeeze moisture from the product. This moisture is passed to waste through longitudinal slits in the barrel housing of the press as previously described. The material is thereafter passed through the discharge end of the press where it is reduced to a relatively large particle size by means of rotating cutter blades.

In the prior art process for the dewatering and size reduction of SBR rubber, as shown in FIG. 5, the relatively large particles from the dewatering press are conveyed into a hammermill-type disintegrator or grinder where they are shredded. The material is thereafter conveyed to a dryer where substantially all of the remaining moisture is removed. At the discharge of the dryer a spiral conveyor lifts the product to a baler where final packaging takes place.

This invention provides for a method for dewatering and reducing the size of wet polymeric material and wherein the dewatering pelletizer accomplishes both the dewatering and complete size reduction of the material making it possible to eliminate the separate grinding step of the prior art method.

Figure 6:
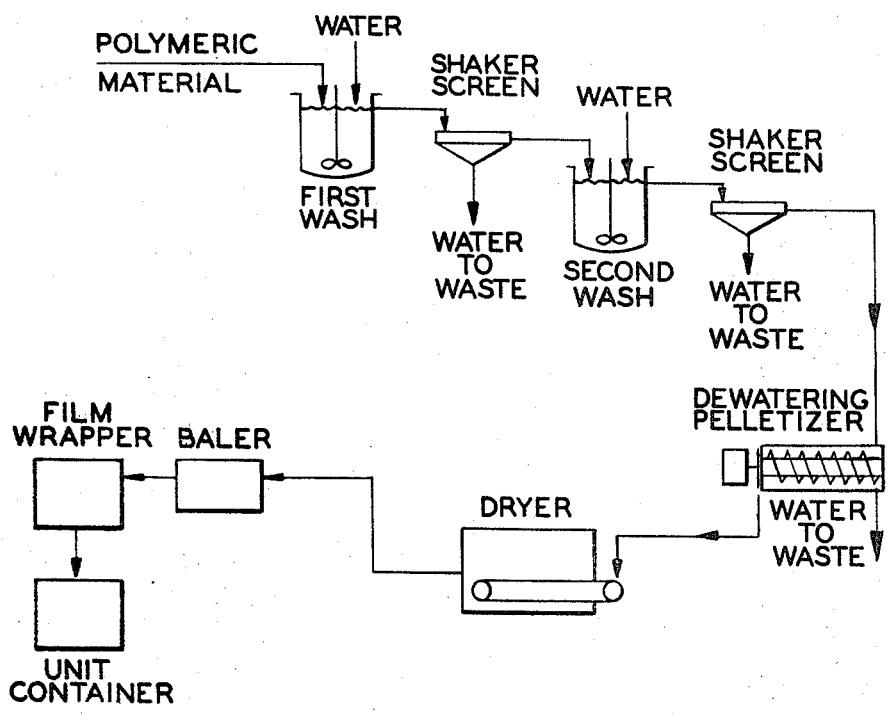
FIG. 6 is a flow chart of the method of this invention for substantially completely drying rubber.

Thus as is shown in FIG. 6 the polymeric material is passed through a first and second wash where it is then passed across a shaker screen to remove a substantial amount of moisture. From the shaker screen the product is led into a dewatering pelletizer where the material is both dewatered and reduced in size to flake form. After discharging from the dewatering pelletizer, the product flakes are blown to a thermal dryer by means of an air conveyor system. It is to be understood that the dewatering pelletizer as shown schematically in FIG. 6 is of the type shown in FIG. 2. After drying the product flakes are blown to a baler by means of an air conveyor where final packaging takes place. Since the product coming from the dryer is in the form of flakes it is sometimes desirable to employ means to compact the material prior to baling in order to prevent undue loss thereof in the packaging operation.

The method steps of this invention will be described now with reference to FIG. 6. The method comprises the steps of:

1. Dewatering wet polymeric material. As used herein the word dewatering denotes the removal of liquid from wet polymeric material; the amount of liquid removed being less than that required to achieve complete dryness. In the preferred embodiment of this invention the dewatering method step is carried out as by providing a barrel housing 54 (FIG. 2) having an input end 64 and an output end 82 and including escape passageways between the dewatering screen bars 56 defining the housing wall. A rotatable shaft 58 is provided within the housing wall. Shaft 58 includes screw flight means 66, 68, 70, 72 and 74 thereon. Shaft 58 is supported at one end 80 by means of a bearing 84 disposed within the output end of the housing. The opposite end of shaft 58 is supported by means of bearings 62 carried by the gear case assembly 63. Dewatering is accomplished as by rotating shaft 58 thereby advancing the wet polymeric material into housing 54 where the material is compacted and masticated by the rotating screw flight means of increasing diameter thus to squeeze liquid from the material.

2. Extruding said material through a die plate. In the preferred embodiment of this invention the extruding method step is carried out as by forcing the material through apertures 100, 102, 104 and 108 of die plate 90 by means of the rotating screw flight 74. Immediately adjacent the high-pressure side of the die plate 90 the polymeric material is compacted into a relatively narrow generally annular space 106. The material inventory immediately behind die plate 90 is thus considerably reduced when compared to the inventory of material within any other portion of barrel housing 54. The apparatus of the preferred embodiment which carried out the extruding method step of this invention also provides sealing means to prevent polymeric material and vapors from coming into contact with the bearing supporting the inner end of the rotating shaft. As previously described with respect to FIG. 3, this sealing structure is defined by the screw flights 122, 130 cooperating with sealing wall 128 which flights function to prevent the entry of polymeric material into the bearing chamber 120. Mechanical seal 138 functions to prevent the entry of vapor into bearing chamber 120 while serving to retain lubricant in the chamber.

3. Shearing the extruded material into thin particle form as it emanates from the die plate. IN the preferred embodiment of this invention the shearing method step is carried out by rotating a set of cutter knives at a high rate of speed immediately adjacent the low-pressure side of die plate 90. Cutter knives 108 of FIG. 3 are driven independently of shaft 58 by means of a separately supported and driven shaft 110. In the preferred embodiment of this invention blades 108 rotate at a rate of speed of approximately 1,750 r.p.m. as compared to a rate of speed of 75 r.p.m. of the shaft 58. In the preferred embodiment of this invention the cutter blades 108 are provided with a sharp leading edge in order to shear the extruded material as it emanates from the die plate 90. The shearing method step is accomplished with the aid of inertial forces as each high-speed cutter knife meets the extruded material while the material is supported by the die plate and prior to deformation of the material (due to its tough elastic nature) as it is forced from the die openings. In the preferred embodiment of this invention the shearing method step is carried out with an apparatus defined by tapered apertures in the die plate such as shown in FIG. 3. Tapered apertures contribute to a wafer thin product in the shearing step by containing and supporting the polymeric material within the barrel until it is cut by the rotating knife.

4. Drying the particles. As used herein the word drying denotes the substantially complete removal of moisture from the material. As shown in FIG. 6 the drying step of this invention is carried out immediately after the shearing step. The necessity of providing an intermediate pelletizer or grinder between the dewatering press and the dryer of the prior art has been eliminated since the wafer thin particle product of the dewatering pelletizer of this invention can be immediately dried without the necessity of an intermediate grinding step.

5. Recovering the dried particles. The final method step of this invention is the recovery of the product from the dryer in a suitable form for further processing into a variety of products. As shown in FIG. 6 the recovery step is accomplished by means of a baler. Since the product coming from the dryer is in a particle or flake form it may be difficult to handle in the baler. Thus, it may be desirable to employ some form of compaction means for the particle product before the introduction thereof into the baler.

While the method of this invention is particularly adapted to process cis-1-4-polyisoprene rubber by dewatering the wet material and cutting it into thin flakes so that it can be later dried in a thermal dryer without the necessity of passing the material into a disintegrator for further size reduction, this invention should not be considered as limited to cis-1-4-polysoprene rubber as it is applicable to polymers in general, particularly other tough, elastic material.

ADVANTAGES OF THE INVENTION

The principal advantage of the apparatus and method of this invention is that polymeric material such as cis-1-4-polysoprene rubber can be dewatered and cut into small particles so that it can be substantially completely dried in a thermal dryer. The necessity for providing a separate disintegrator or grinder between the dewatering press and the thermal dryer has been eliminated by the apparatus and method of this invention as the product of the dewatering pelletizer is in the form of relatively small particles or flakes suitable for drying in a thermal dryer.

The method and apparatus of this invention reduce the moisture content of polymeric material from approximately 50 percent to 3 percent while producing a product having a particle thickness of approximately 1/64 of an inch. As an example of the operating requirements of the apparatus of this invention approximately 200 hp. is necessary to operate the dewatering screws whereas 40 hp. is required for the independent operation of the cutter mechanism.

Table 1 is a brief summary of some of the physical characteristics of polymeric material both before and after dewatering, cutting and drying in the dewatering pelletizer and thermal dryer. It is to be noted from FIG. 1 that the moisture content of the material is reduced from about 50 percent to about 3 percent in the dewatering pelletizer whereas thermal drying further reduces the moisture content to approximately 0.2 percent.

TABLE 1

| | Before press | In press | After press | Dryer | After dryer |
|---|---|---|---|---|---|
| Pressure | (0) atmospheric | 0-100 p.s.i. | 0 | 0 | 0 |
| Temp. °F | 190 | 190-230 | 230 | 220-180 | 180 |
| Residence | | Approx. 3 min. | Approx. 70 min. | | |
| Moisture, 50 percent | | 50-3 | 3 | 3-0.2 | 0.2 |

As will be further observed from table 1, the operating pressure within the dewatering pelletizer varies from atmospheric pressure to approximately 100 p.s.i. In contrast to this range of pressure is the range of pressure in the conventional SBR dewatering press from atmospheric to approximately 4,000 p.s.i. depending upon the position of the choke mechanism. The apparatus of this invention provides for relatively low extrusion pressures since the polymeric material is confined in a relatively small annular space (106, FIG. 2) thereby reducing the material inventory that is built up behind the die plate. Therefore, the only pressure required for extrusion is that necessary to push the polymer through the die openings.

MODIFICATIONS OF THE INVENTION

Several modifications of the apparatus of this invention are contemplated and should be considered within the spirit of the invention.

In the embodiment of FIG. 2 the bearing boss 88 and sealing wall 128 are defined as an integral part of the die plate 90. A slight modification of the die plate structure is shown in FIG. 3 wherein it is to be noted that the bearing boss 88 is defined by a separate element attached to die plate 90 by means of fasteners 144. Sealing wall 128 of FIG. 3 is further defined by a generally annular element secured to the bearing boss 88. Further it will be noted from FIG. 3 that shaft 110 is not directly supported by die plate 90 (as is shown in FIG. 2) but rather is supported by a support member 160 secured to the die plate 90 by means of fasteners 141. The die plate 90 and support member 160 of FIG. 3, however, define a generally impervious member through which polymeric material may pass only by means of apertures 100, 102, 104 and 107.

In the embodiment of FIG. 4 the bearing boss 88 is defined by a separate element attached to die plate 90. As in FIG. 3 the sealing wall 128 of FIG. 4 is generally defined by an annular element secured to the bearing boss 88.

This invention should not be considered limited to the particular structure providing rotatable support for the shaft 58 within the barrel housing. Many additional structures providing support for the rotatable shaft should be considered including those that do not depend from the die plate 90. Thus, shaft 58 could be supported within the output end of the barrel housing by means other than the die plate 90.

In the embodiment of FIG. 4 the walls defining apertures 100, 102, 104 and 107 are generally cylindrical. A slightly modified aperture is shown in FIG. 3 wherein the walls defining apertures 100, 102, 104 and 107 are slightly tapered defining frustoconical surfaces in the die plate 90. The tapered apertures of FIG. 3 are preferred, in fact, since the cutting knives 108 tend to pull the polymer out of the die plate. The tapered openings contain the material in the process of extrusion permitting the sharp leading edge of the cutter knives 108 to produce wafer thin particles.

For ease of description the principles of this invention have been set forth in connection with but a single illustrated embodiment thereof. It is not our intention, however, that the illustrated embodiment nor the terminology employed in describing it be limiting inasmuch as variations may be made without departing from the spirit of this invention. Rather, we desire to be restricted only by the scope of the appended claims.

We claim:

1. A dewatering pelletizer for dewatering and reducing the size of wet polymeric material comprising in combination:
    an elongated barrel housing having an axis, an input end and an output end;
    means to permit the escape of liquid from said housing;
    a rotatable shaft having at least a portion thereof disposed axially within said housing with an end of said shaft disposed within said output end of said housing;
    screw flight means carried by said shaft;
    bearing means for rotatably supporting said portion of said shaft in said housing, said bearing means including a bearing supporting said shaft end within said output end of said housing and bearing seat means supported within said housing;
    die plate means secured to said housing and disposed normal to the axis of said housing at said output end thereof, said housing and said die plate means enclosing said shaft end and said bearing;
    sealing means defined by a generally annular screw flight section secured to said shaft to isolate said bearing from polymeric material as it passes through said output end of said housing;
    circumferentially spaced apertures in said die plate means for the passage of polymeric material therethrough;
    cutting means adjacent said die plate means and adapted to rotate independently of said shaft to reduce the size of the polymeric material as it passes through said die plate means.

2. The invention of claim 1 in which the generally annular screw flight section secured to said shaft is further defined by external and internal screw flights;
    the space between said external screw flight and the internal wall of said housing defining a generally annular discharge passage for polymeric material;
    said internal screw flight being disposed closely adjacent said bearing seat means whereby polymeric material is prevented from entering the chamber surrounding said bearing.

3. The invention of claim 2 in which said bearing seat means is provided with a generally annular sealing wall having an inner and outer surface and extending from said bearing seat means coaxial with said screw flight section, said outer surface disposed closely adjacent said internal screw flight; and
    a secondary internal screw flight means is secured to said shaft closely adjacent said inner wall.

4. The invention of claim 3 in which said secondary internal screw flight means is further defined by a generally annular element coaxial with said screw flight section and having a screw flight on the external surface thereof.

5. The invention of claim 4 in which said secondary internal screw flight element is operatively secured to said shaft by means of fasteners extending through a radial shoulder of said element into a radial shoulder of said screw flight section.

6. The invention of claim 2 in which said bearing seat means is further provided with a seal extending from said bearing seat means into contact with said shaft whereby lubricating oil can be retained in said bearing and steam and other vapors are precluded from coming into contact with said bearing.

7. The invention of claim 1 in which said bearing seat means depends from said die plate means.

8. The invention of claim 7 in which said die plate means is further defined by a generally circular plate secured to said housing in blocking relationship to said output end with said shaft end disposed within said housing, the internal wall of said plate including a bearing boss defining said bearing seat means.

9. The invention of claim 8 in which a cutter bearing seat is provided in the external surface of said plate and is adapted to receive a rotating cutter driven independently of said shaft.

10. A dewatering pelletizer for dewatering and reducing the size of wet polymeric material comprising in combination:
    an elongated barrel housing defined by a plurality of slightly spaced screen bars defining escape passages through which liquid can be forced, said barrel housing having an input end and an output end;
    a rotatable shaft disposed axially within said housing, said shaft having a first and extending through said housing and supported for rotation by means of a bearing and adapted to be driven by a suitable power source, and a second end disposed within said output end of said barrel housing;
    a plurality of dewatering screw flights carried by said shaft and including a generally annular screw flight section adjacent said second end and defining with the internal wall of said barrel housing a generally annular space;
    a generally annular die plate secured to said housing at said output end;
    a generally circular support member secured to said die plate coaxial with said rotatable shaft;

a generally annular bearing boss secured to said die plate and disposed coaxial with said rotatable shaft, said bearing boss including a bearing seat adapted to receive a bearing providing rotatable support for said second end of said rotatable shaft;

vapor sealing means extending from said bearing boss into contact with said rotatable shaft, said sealing means and said bearing boss defining a lubrication chamber for said bearing;

circumferentially spaced tapered apertures in said die plate for the passage of polymeric material therethrough;

said generally annular screw flight section defined by external and internal screw flights;

a generally annular sealing wall having an inner and outer surface and extending from said bearing boss coaxial with said shaft, said outer surface disposed closely adjacent said internal screw flight of said annular screw flight section;

a secondary internal screw flight defined by a generally annular element coaxial with said shaft and operatively secured to said shaft and having a screw flight on the external surface thereof and having a screw flight closely adjacent said inner surface of said sealing wall;

a cutter bearing seat in said support member;

a rotatable cutter shaft supported by said cutter bearing seat and adapted to be driven by an external power source independently of said rotatable shaft;

a plurality of spaced cutter knives mounted on said cutter shaft, each cutter knife having a sharp leading edge and so positioned with respect to said die plate that they meet the extruded material while the material is supported by the walls of the die plate defining said tapered apertures as it is forced from said die plate.